(12) United States Patent
Boldyrev et al.

(10) Patent No.: US 9,038,197 B2
(45) Date of Patent: May 19, 2015

(54) METHOD AND APPARATUS FOR PROVIDING BACKEND SUPPORT FOR DEVICE CONTROL IN RISK CONDITIONS

(75) Inventors: Sergey Boldyrev, Söderkulla (FI); Jari-Jukka Harald Kaaja, Järvenpää (FI); Mikko Aleksi Uusitalo, Helsinki (FI); Ian Justin Oliver, Söderkulla (FI)

(73) Assignee: Nokia Technologies Oy, Espoo (FI)

( * ) Notice: Subject to any disclaimer, the term of this patent is extended or adjusted under 35 U.S.C. 154(b) by 9 days.

(21) Appl. No.: 13/371,976

(22) Filed: Feb. 13, 2012

(65) Prior Publication Data

US 2013/0212713 A1 Aug. 15, 2013

(51) Int. Cl.
| | |
|---|---|
| G06F 1/26 | (2006.01) |
| G08B 13/00 | (2006.01) |
| G08B 21/00 | (2006.01) |
| G08B 29/00 | (2006.01) |
| H04W 4/00 | (2009.01) |

(52) U.S. Cl.
CPC ..................... *H04W 4/003* (2013.01)

(58) Field of Classification Search
None
See application file for complete search history.

(56) References Cited

U.S. PATENT DOCUMENTS

| | | | |
|---|---|---|---|
| 2001/0051515 | A1 | 12/2001 | Rygaard |
| 2004/0066302 | A1 | 4/2004 | Menard et al. |
| 2007/0232272 | A1* | 10/2007 | Gonsalves et al. ......... 455/412.1 |
| 2010/0210240 | A1* | 8/2010 | Mahaffey et al. ............ 455/411 |
| 2011/0093463 | A1 | 4/2011 | Oliver et al. |
| 2011/0141276 | A1 | 6/2011 | Borghei |
| 2012/0166646 | A1 | 6/2012 | Boldyrev et al. |

OTHER PUBLICATIONS

Notification of Transmittal of the International Search Report and the Written Opinion of the International Searching Authority, or the Declaration; International Search Report; Written Opinion for corresponding International Application No. PCT/FI2013/050070, dated Jun. 20, 2013, pp. 1-16.
R. Nyman, "Using the Vibration API—Part of WebAPI", archived Feb. 4, 2012, retrieved on Jun. 17, 2013 from web page http://web.archive.org/web/20120204010020/http://hacks.mozilla.org/2012/01/using-the-vibration-api-part-of-webapi/?, pp. 1-8.
Wikipedia, "Load balancing (computing)", archived Jan. 31, 2012, retrieved on Jun. 17, 2013 from web page http://en.wikipedia.org/w/index.php?title=Load_balancing_%28computing%29&oldid=474234577, pp. 1-7.

* cited by examiner

*Primary Examiner* — Kambiz Zand
*Assistant Examiner* — Trong Nguyen
(74) *Attorney, Agent, or Firm* — Alston & Bird LLP

(57) ABSTRACT

An approach is provided for providing backend support for device control in risk conditions. A device control support platform determines one or more computational chains consisting of one or more computation closures for managing one or more risk conditions associated with at least one device. The device control support platform further causes a projection, a distribution, or a combination thereof of the one or more computational chains, the one or more computation closures, or a combination thereof to one or more other devices. The device control support platform also causes an execution of at least a portion of the one or more computational chains, the one or more computational closures, or a combination thereof to cause an initiation of at least one computational broker at the at least one device for managing the one or more risk condition.

16 Claims, 15 Drawing Sheets

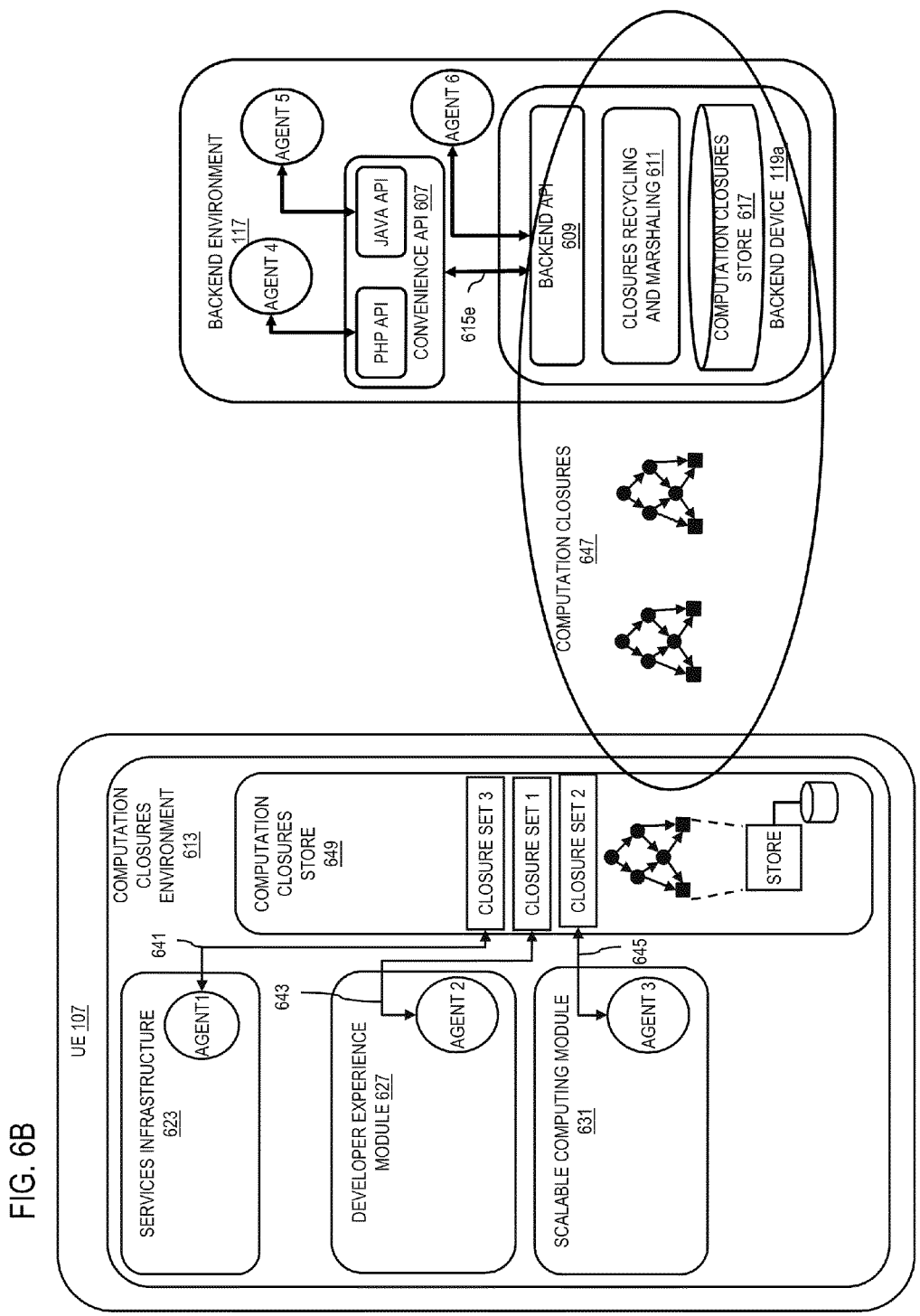

METHOD AND APPARATUS FOR PROVIDING BACKEND SUPPORT FOR DEVICE CONTROL IN RISK CONDITIONS

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications and the information stored by those applications is a major challenge of interoperability.

The mobile devices usually provide access to a high volume of important information to their users, and therefore they can become an inseparable tool for a user such that their unavailability even for a short period of time may lead to significant inconvenience for the users.

However, there is always some risk that the mobile devices fall down and get damaged, or become partly nonoperational. Additionally, there is a possibility of devices being left and forgotten in some place, being dropped in hidden corners, and similar situations that users want to avoid. For example, a mobile device may drop inside a sofa while it is in silent mode. Furthermore, devices may be knocked off the table, knocked into risky (near fall) positions, or being unnecessarily left in places for too long.

SOME EXAMPLE EMBODIMENTS

Therefore, there is a need for an approach for providing backend support for device control in risk conditions.

According to one embodiment, a method comprises determining one or more computational chains consisting, at least in part, of one or more computation closures for managing one or more risk conditions associated with at least one device. The method also comprises causing, at least in part, a projection, a distribution, or a combination thereof of the one or more computational chains, the one or more computation closures, or a combination thereof to one or more other devices. The method further comprises causing, at least in part, an execution of at least a portion of the one or more computational chains, the one or more computational closures, or a combination thereof to cause, at least in part, an initiation of at least one computational broker at the at least one device for managing the one or more risk conditions.

According to another embodiment, an apparatus comprises at least one processor, and at least one memory including computer program code for one or more computer programs, the at least one memory and the computer program code configured to, with the at least one processor, cause, at least in part, the apparatus to determine one or more computational chains consisting, at least in part, of one or more computation closures for managing one or more risk conditions associated with at least one device. The apparatus is also caused to cause, at least in part, a projection, a distribution, or a combination thereof of the one or more computational chains, the one or more computation closures, or a combination thereof to one or more other devices. The apparatus is further caused to cause, at least in part, an execution of at least a portion of the one or more computational chains, the one or more computational closures, or a combination thereof to cause, at least in part, an initiation of at least one computational broker at the at least one device for managing the one or more risk conditions.

According to another embodiment, a computer-readable storage medium carries one or more sequences of one or more instructions which, when executed by one or more processors, cause, at least in part, an apparatus to determine one or more computational chains consisting, at least in part, of one or more computation closures for managing one or more risk conditions associated with at least one device. The apparatus is also caused to cause, at least in part, a projection, a distribution, or a combination thereof of the one or more computational chains, the one or more computation closures, or a combination thereof to one or more other devices. The apparatus is further caused to cause, at least in part, an execution of at least a portion of the one or more computational chains, the one or more computational closures, or a combination thereof to cause, at least in part, an initiation of at least one computational broker at the at least one device for managing the one or more risk conditions.

According to another embodiment, an apparatus comprises means for determining one or more computational chains consisting, at least in part, of one or more computation closures for managing one or more risk conditions associated with at least one device. The apparatus also comprises means for causing, at least in part, a projection, a distribution, or a combination thereof of the one or more computational chains, the one or more computation closures, or a combination thereof to one or more other devices. The apparatus further comprises means for causing, at least in part, an execution of at least a portion of the one or more computational chains, the one or more computational closures, or a combination thereof to cause, at least in part, an initiation of at least one computational broker at the at least one device for managing the one or more risk conditions.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A-6B are diagrams of computation distribution among devices, according to one embodiment;

DESCRIPTION OF SOME EMBODIMENTS

Examples of a method, apparatus, and computer program for providing backend support for device control in risk conditions are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "computation closure" identifies a particular computation procedure together with relations and communications among various processes including passing arguments, sharing process results, selecting results provided from computation of alternative inputs, flow of data and process results, etc. The computation closures (e.g., a granular reflective set of instructions, data, and/or related execution context or state) provide the capability of slicing of computations for processes and transmitting the computation slices between devices, infrastructures and information sources.

As used herein, the term "cloud" refers to an aggregated set of information and computation closures from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats. Although various embodiments are described with respect to clouds, it is contemplated that the approach described herein may be used with other structures and conceptual description methods used to create distributed models of information and computations.

Figure 1:
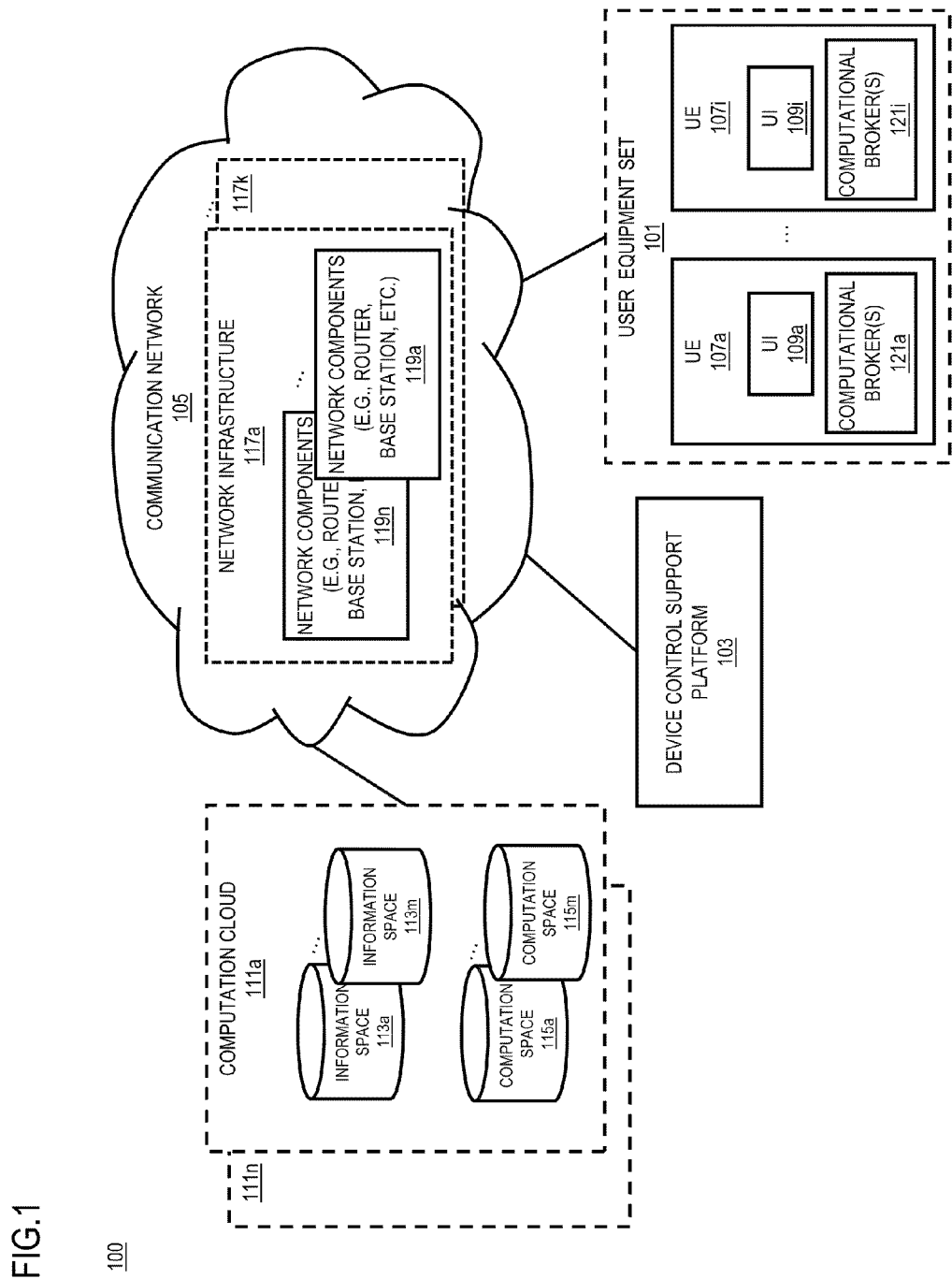
FIG. 1 is a diagram of a system capable of providing backend support for device control in risk conditions, according to one embodiment.

FIG. 1 is a diagram of a system capable of providing backend support for device control in risk conditions, according to one embodiment. In one embodiment, a mechanism is provided for backend integration for translating user intent (e.g. for locating a mobile device) into one or more computational chains (e.g., sets of computation closures) which are projected into computation activation for controlling (e.g., vibrating) the mobile device. The backend support may provide various options to the user for locating the mobile device.

In one embodiment, the backend environment may include a cloud environment consisting of information and computation resources each consisting of several distributed devices that communicate information and computation closures (e.g. RDF graphs) via a shared memory. A device within a cloud environment may store computation closures locally in its own memory space or publish computation closures on a globally accessible environment within the cloud. In the first case, the device is responsible for any process needed for combination or extraction of computations, while in the second case the processes can be conducted by the globally accessible environment which includes the device. The device can utilize the resources of the architectural infrastructure level, for example for controlling other devices, without having to access the cloud level. Alternatively, a device may have direct computational closure connectors to cloud level, where devices are more tightly linked to cloud environment for device controlling purposes.

The basic concept of cloud computing technology provides access to distributed computations for various devices within the scope of the cloud, in such a way that the distributed nature of the computations is hidden from users and it appears to a user as if all the computations are performed on the same device. The cloud computing also enables a user to have control over computation distribution by transferring computations between devices that the user has access to. For example, a user may want to transfer computations among work devices, home devices, and portable devices, other private and public devices, etc. Current technologies enable a user of a mobile device to manipulate contexts such as data and information via the elements of a user interface of their user equipment. However, distribution of computations and processes related to or acting on the data and information within the cloud is typically controlled by the system. In other words, a cloud in general does not provide a user (e.g., an owner of a collection of information distributed over the information space) with the ability to control distribution of related computations and processes of, for instance, applications acting on the information. For example, a contact management application that processes contact information distributed within one or more clouds generally executes on a single device (e.g., with all processes and computations of the application also executing on the same device) to operate on the distributed information. In some cases (e.g., when computations are complex, the data set is large, etc.), providing a means to also distribute the related computations in addition to the information is advantageous.

This goal is achieved by introduction of the capability to construct, distribute, and aggregate computations as well as their related data. More specifically, to enable a user of a cloud (e.g., a mobile device user, an application developer, etc.) who connects to the cloud via one or more devices, to distribute computations among the one or more user devices or other devices with access to the cloud, each computation is deconstructed to its basic or primitive processes or computation closures. Once a computation is divided into its primitive computation closures, the processes within or represented by each closure may be executed in a distributed fashion and the processing results can be collected and aggregated into the result of the execution of the initial overall computation.

In one embodiment, a computational architecture consists of a plurality of architectural levels, including a device level, and infrastructure level, and a cloud computing level. A device from the device level has connectivity to the cloud computing level via one or more infrastructure levels, wherein each infrastructure level may consist of layers and components such as backbones, routers, base stations, etc. Typically, the computation closures associated with a process related to a device from device level are defined, constructed, and executed within the cloud computing level which may have various levels of distribution as well. However, the components of the infrastructure levels may be equipped with various resources (e.g., processing environments, storage spaces, etc.) that can be utilized for the execution of computation closures associated with a process. Since the infrastructure level functions as an interface between the device level and the cloud computing level, if the computation closures can be executed in the infrastructure level, there will be no need for the computation closures to be migrated (transmitted) to the cloud computing level that may very well require excessive use of resources. Therefore, execution of computation closures associated with a process related to a device at the infrastructure level can provide services to device users in a more efficient manner.

In one embodiment, the backend (at device level, infrastructure level, or cloud level), provides one or more computation chains that can use triggering, notification, one or more control mechanisms, or other defined mechanisms, to integrate the backend into the functional chains for device control (e.g., search, vibration, etc.) It is noted that the computational chains may be equipped with protection and restoration schemes during risk conditions.

In one embodiment, the vibration function of mobile devices can play an important role in preventing devices to break or become nonoperational upon falling accidentally. In various embodiments if control mechanisms are activated via the backend when a device is intelligently operating with backend support, cases such as damages due to falling accidents, risk positions that may lead to a fall or other damages, etc. can be avoided.

To address the above mentioned problems, a system 100 of FIG. 1 introduces the capability to provide backend support for device control in risk conditions. In one embodiment, computational projection and control support provided from backend (from other devices, infrastructures, or clouds) to client side initiates a computational broker on client side (e.g. a device vibrator) in order to find device, identify device, prevent damage due to fall, change risky position of the device, etc.

As shown in FIG. 1, the system 100 comprises a set 101 of user equipment (UEs) 107a-107i having connectivity to a device control support platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the UEs 107a-107i are respectively equipped with one or more user interfaces (UI) 109a-109i. Each UI 109a-109i may consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). These contexts may require certain sets of media dependent computational closures, which may affect the service, for example the bit error rate, etc. Additionally, each UI element may be bound to a context/process by granular distribution. In one embodiment, granular distribution enables processes to be implicitly or explicitly migrated between devices, computation clouds, and other infrastructure. Additionally, a UE 107a-107i may be a mobile device with embedded Radio Frequency (RF) tag system of device to device connections such that computational operations and content can be locally transmitted among devices.

In one embodiment, computational closure controllable reflection mechanisms are provided for backend integration in initiation of a computational broker 121a-121i on UE 107a-107i, for example, when searching the mobile device. This means that a user or owner of UE 107a-107i is able to transparently locate and engage the device, for example with vibrators, with backend support. In this embodiment, a distributed computational chain between the client device 107a-107i and backend (other devices 107a-107i, infrastructures 117a-117k, clouds 111a-111n) is provided by the device control support platform 103. Additionally, the client device 107a-107i is provided with a corresponding computational broker 121a-121i for triggering, notification and defined control mechanisms that integrate the backend to the functional chain of device control (e.g. vibration for device search).

In one embodiment, while searching for a device (UE 107a-107i), available vibrators on the UE 107a-107i are utilized together with loss prevention notifications and control mechanisms initiated by the device control support platform 103, for example, to notify the user with backend support that the device is in a risk position, device is left in a location for a long time, device was dropped to a hidden place, or various other situations that the user may want to avoid (e.g. device dropped inside the layers of a chair in silent mode). Furthermore, UEs 107a-107i are sometimes left or knocked into risk positions or positions that may cause the device to fall down, to become hidden, or to be unnecessarily left in places for long periods of time.

In one embodiment, the function of the computational chain flows through the whole system. For example, a computational chain for notifying a user of UE 107a-107i and controlling the UE 107a-107i may initiate a vibration component to start operating in "find my phone" mode. Additionally or alternatively, the computational chain may provide alert to the user of one or more target devices UE 107a-107i and recommend that the one or more device locations be changed due to possible risk. The alert to the user may be provided via other UEs 107a-107i associated with the same user that are located in the vicinity of the device at risk such as, for example, another mobile device, a computer, a television set, etc. The other UEs may not directly belong to the user of the UE 107a-107i at risk but for example belong to a family member, a friend (via a social network), etc. Furthermore, the computational chain may vibrate the UEs 107a-107i in specific style or direction to slide each UE 107a-107i into a safer position, for example against the edge of a table that the UE 107a-107i is positioned on.

In one embodiment, the backend support by the device control support platform 103 may allow the user of UE 107a-107i to login into a service account and instantly view the UE 107a-107i on a map, send a message to the UE 107a-107i, force the UE 107a-107i to play a sound regardless of silent mode, utilize vibration control, or a combination thereof. Furthermore, other service functions can be enabled in a similar manner.

In one embodiment, the device control support platform 103 can enable the user to remotely remove private or sensitive information, or erase every data from the UE 107a-107i, if necessary. The user may also send a lock pass-code to the UE 107a-107i to prevent the UE being access by unauthorized entities until the UE is collected by the user.

In one embodiment, the device control support platform 103 enables a UE 107a-107i to activate its camera, microphone, vibrator, or any other computational brokers 121a-121i in order to help the user to locate the UE 107a-107i. The device control support platform 103 may also request a nearest access point, with the lost UE 107a-107i within its coverage area, to help locating the UE 107a-107i.

In one embodiment, the device control support platform 103 enables a UE 107a-107i to engage other UEs 107a-107i which are equipped with computational closures chains framework, in order to project at least a part of the functions of the computational brokers 121a-121i to the other UEs for any further actions. For example, a UE 107a-107i may notify the user via another UE 107a-107i associated with the same user, of its location.

In various embodiments, the device control support platform 103 and its components can be located anywhere throughout the network, in UEs 107a-107i, in network infrastructures 117a-117k, within any network component 119a-119n, in other server or service provider locations, in computation cloud 111a-111n, or a combination thereof.

By way of example, the UEs 107a-107i, and the device control support platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
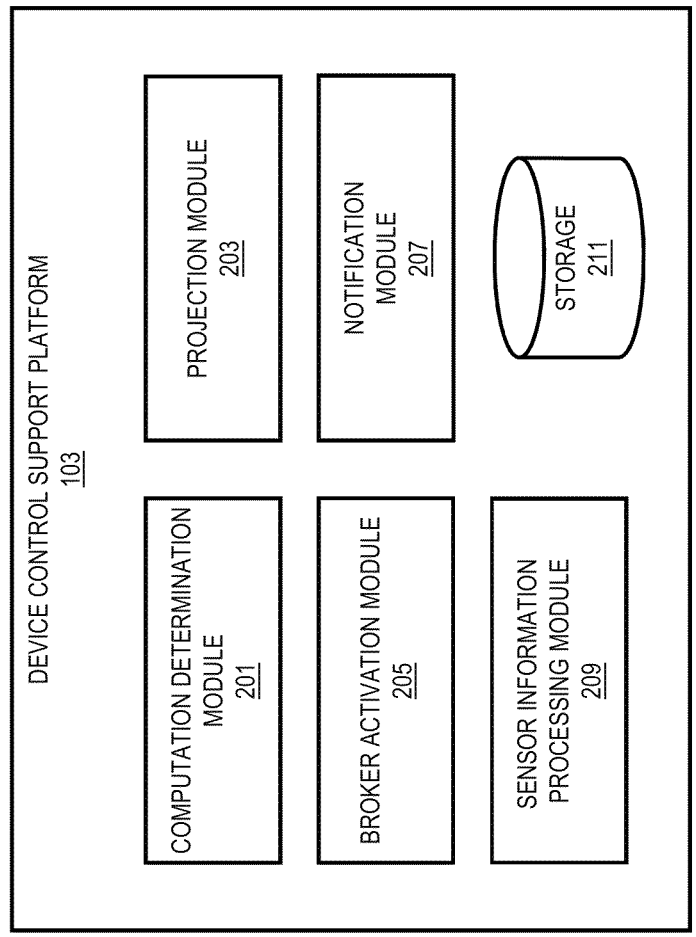
FIG. 2 is a diagram of the components of a device control support platform, according to one embodiment.

FIG. 2 is a diagram of the components of a device control support platform, according to one embodiment. By way of example, the device control support platform 103 includes one or more components for providing backend support for device control in risk conditions. It is contemplated that the functions of these components may be combined in one or more components or performed by other components of equivalent functionality. In this embodiment, the device control support platform 103 includes a computation determination module 201, a projection module 203, a broker activation module 205, a notification module 207, a sensor information processing module 209, and a storage 211.

Figure 3A:
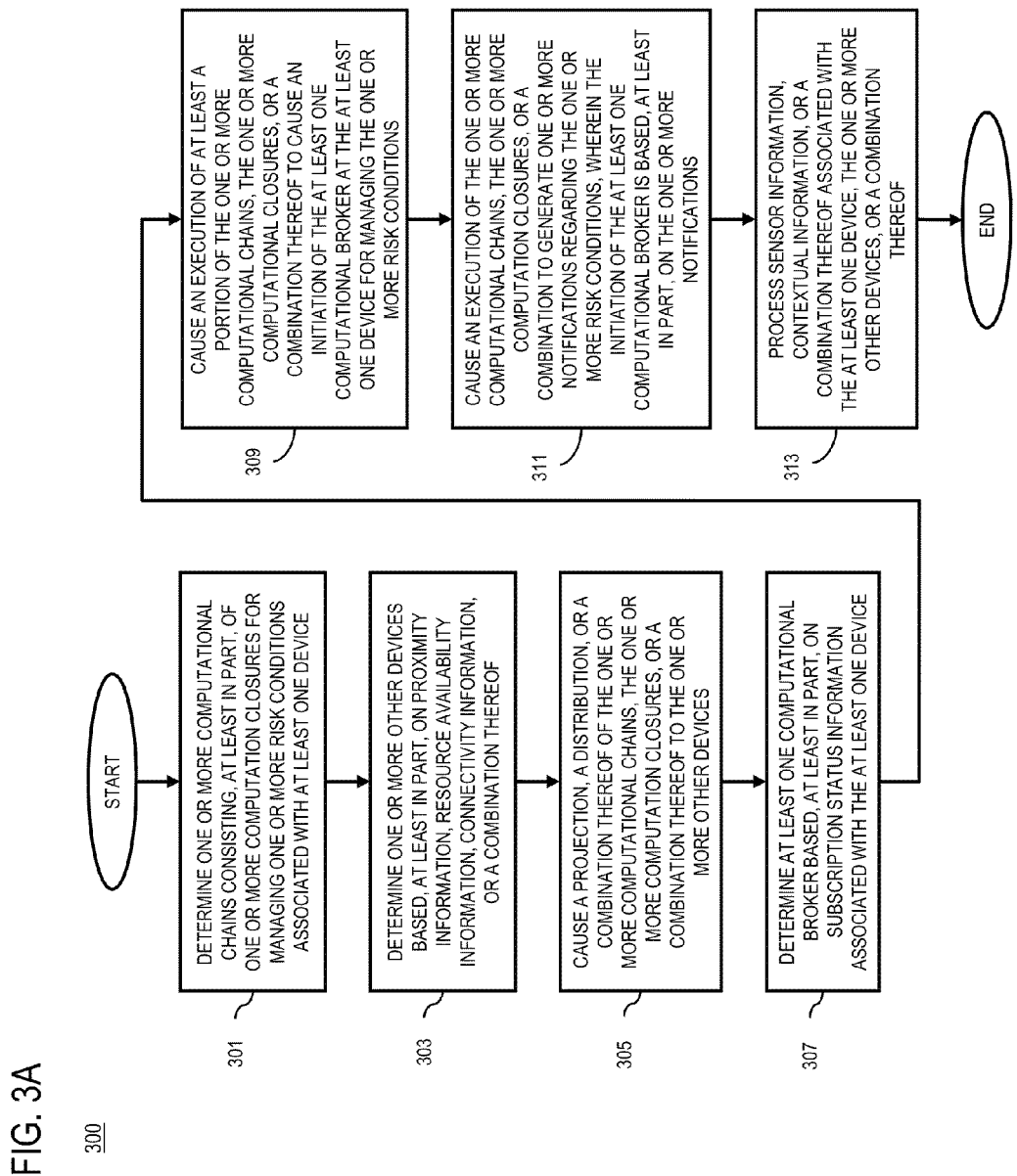
FIGS. 3A-3B are flowcharts of processes for providing backend support for device control in risk conditions, according to one embodiment.
Figure 11:
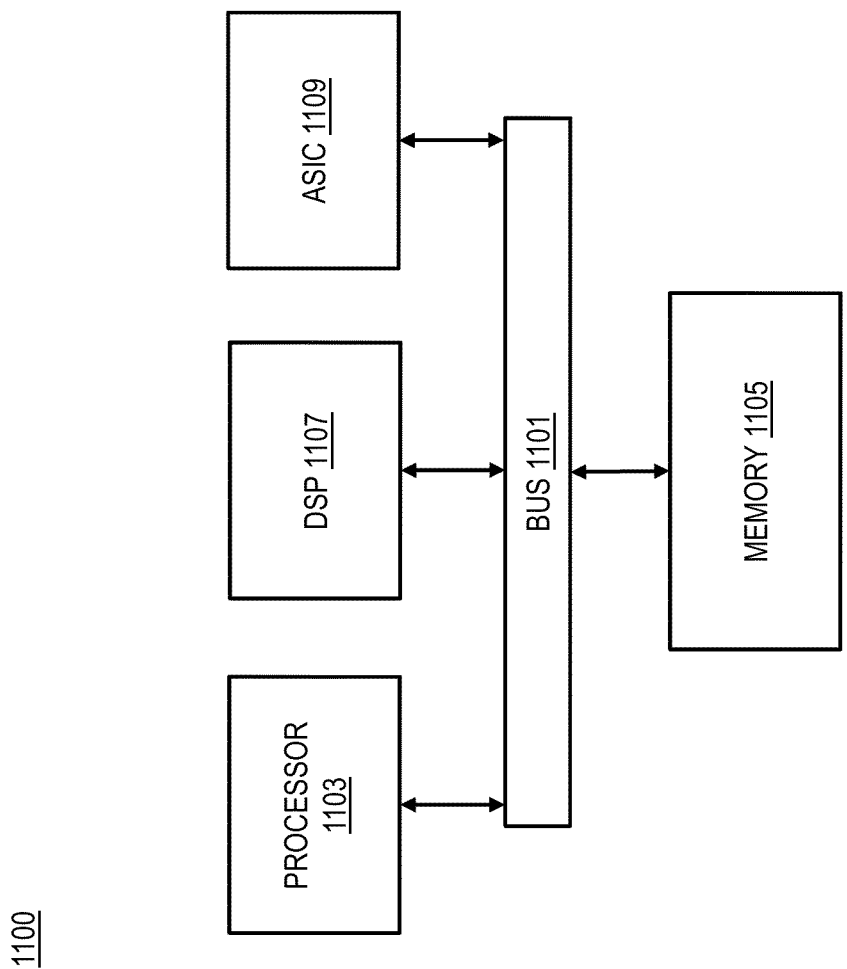
FIG. 11 is a diagram of a chip set that can be used to implement an embodiment of the invention.

FIG. 2 is described with reference to FIG. 3A, wherein FIG. 3A is a flowchart of a process for providing backend support for device control in risk conditions, according to one embodiment. In one embodiment, the device control support platform 103 performs the process 300 and is implemented in, for instance, a chip set including a processor and a memory as shown in FIG. 11.

In one embodiment, in step 301 of flowchart 300 of FIG. 3A, the computation determination module 201 determines one or more computational chains consisting, at least in part, of one or more computation closures for managing one or more risk conditions associated with at least one UE 107a-107i.

In one embodiment, the computation chains, computation closures or a combination may be predefined for every risk condition and stored in the computation spaces 115a-115m of computation clouds 111a-111n, in storage 211, in a local storage within the UE 107a-107i, or a combination thereof. Furthermore, the computation determination module 201 may be trained based on past risk conditions, for example by using machine learning techniques, such that the device control support platform 103 can learn from past user actions towards risk condition to predict an upcoming risk and activate certain computation chains in order to prevent an adverse condition. The past actions by the user, by the device control support platform 103, or a combination, may be retrieved from system logs. Additionally, the computation chains, computation closures or a combination may be predefined by the manufacturer, defined by a user of the UE 107a-107i during device setup, or a combination thereof. Furthermore, a user of a UE 107a-107i may use the UE to directly enter their desired risk condition setup to the UE, may enter settings remotely via other UEs associated with the same user, or a combination thereof. For example, a user may use one or more other UEs 107a-107i to activate a vibrator on a UE 107a-107i which is lost and has been set to silent mode.

In one embodiment, per step 303 of FIG. 3, the projection module 203 determines one or more other UEs 107a-107i based, at least in part, on proximity information, resource availability information, connectivity information, or a combination thereof. Subsequently, per step 305 of FIG. 3, the projection module 203 causes, at least in part, a projection, a distribution, or a combination thereof of the one or more computational chains, the one or more computation closures, or a combination thereof to the one or more other UEs 107a-107i.

In one embodiment, per step 307 of FIG. 3, the broker activation module 205 determines at least one computational broker 121a-121i based, at least in part, on subscription status information associated with the at least one UE 107a-107i. For example, the broker activation module 205 may obtain information related to a subscription of a UE 107a-107i to backend support services. The subscription information may be obtained from storage 211, information spaces 115a-115m, local storage of UE 107a-107i (not shown) or a combination thereof.

In one embodiment, per step 309 of FIG. 3, the broker activation module 205 causes, at least in part, an execution of at least a portion of the one or more computational chains, the one or more computational closures, or a combination thereof to cause, at least in part, an initiation of at least one computational broker 121a-121i at the at least one UE 107a-107i for managing the one or more risk conditions.

The one or more risk conditions may relate, at least in part, on one or more temporal parameters, one or more location parameters, one or more positional parameters, one or more postural parameters, or a combination thereof associated with the at least one UE 107a-107i.

In one embodiment, the at least one computational broker 121a-121i may cause, at least in part, an initiation of one or more actions at the least one UE 107a-107i, the one or more other UEs 107a-107i, or a combination thereof based, at least in part, on the one or more risk conditions. For example, a computational broker 121a-121i may cause activation of a vibrator, an alarm, a camera, a microphone, or a combination associated with the UE 107a-107i, with another UE 107a-107i, or a combination thereof.

In one embodiment, the one or more actions include, at least in part, one or more activations of at least one vibration control mechanism to cause, at least in part, a change in a location, a position, a posture, or a combination thereof of at the least one UE 107a-107i. For example, a vibration control mechanism may vibrate a UE 107a-107i, which is positioned near the edge of a table, in a direction that can cause the UE to move towards the center of the table and avoid the risk of falling off the table.

In one embodiment, per step 311 of FIG. 3, the notification module 207 causes, at least in part, an execution of the one or more computational chains, the one or more computation closures, or a combination to generate one or more notifications regarding the one or more risk conditions, wherein the initiation of the at least one computational broker by the broker activation module 205 can be based, at least in part, on the one or more notifications.

In one embodiment, the one or more notifications may be sent to the user via another UE 107a-107i, to the broker activation module 205, to the computational brokers 121a-121i to cause initiation of actions at the UE 107a-107i, or a combination thereof.

In one embodiment, per step 313 of FIG. 3, the sensor information processing module 209 processes and/or facilitates a processing of sensor information, contextual information, or a combination thereof associated with the at least one UE 107a-107i, the one or more other UEs 107a-107i, or a combination thereof. The sensor information can provide information related to location, position, environmental risks and hazards (for example spilled water close to the UE 107a-107i), or a combination thereof associated with the UE 107a-107i.

In various embodiments, the computation determination module 201, the projection module 203, the broker activation module 205, the notification module 207, or a combination thereof may use the results from sensor information processing for determination and distribution of the computational chains and closures, initiation of the computational brokers, providing the notifications or a combination thereof.

In one embodiment, the one or more other devices may include, at least in part, one or more server devices (not shown), one or more devices of infrastructure 117a-117k such as one or more network components 119a-119n, one or more other UEs 107a-107i, belonging to the same user, one or more peer devices (for example, other UEs 107a-107i belonging to different users who are on the same circle in a social network), or a combination thereof.

Figure 3B:
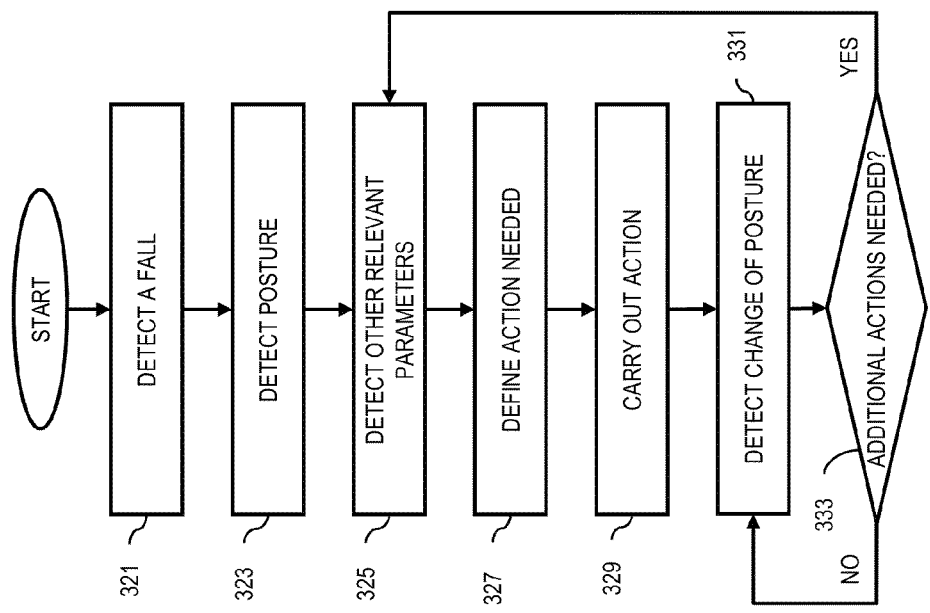

FIG. 3B is an exemplary flowchart of a process for backend support in risk condition. In one embodiment, per step 321 of FIG. 3B, the computation determination module 201 detects a fall of a UE 107a. The detection may be based on receiving sensor information from the UE 107a, monitoring information from another UE 107b (not shown) or from various other devices in the vicinity of the UE 107a. For example, a security camera may detect and report the fall to the device control support platform 103.

In one embodiment per step 323 of FIG. 3B, the computation determination module 201 detects a posture of a UE 107a. The detection may be based on receiving sensor information from the UE 107a, monitoring information from another UE 107b (not shown) or from various other devices in the vicinity of the UE 107a. For example, a security camera may detect and report the posture to the device control support platform 103.

In one embodiment, per step 325 of FIG. 3B, the computation determination module 201 determines other relevant parameters such as for example current location, position, environmental effects, etc. associated with the UE 107a.

In one embodiment, per step 327 of FIG. 3B, the computation determination module 201 determines the actions that should be taken with regards to the collected information in steps 321 to 325. This step is a preparation for step 301 of FIG. 3A wherein the computational chains and closures are determined.

In one embodiment, per step 329 of FIG. 3B, the device control support platform 103 performs the process of FIG. 3A. In one embodiment, upon completion of the device control process, per step 331 the computation determination module 201 continues collecting information about current location, position, environmental effects, etc. associated with the UE 107a.

In one embodiment, per step 333 of FIG. 3B, if the computation determination module 201 determines based, at least in part, on the detected information, that the UE 107a is in risk condition and further actions for controlling of the UE 107a is necessary, the process will continue from step 325. Otherwise, if no risk is detected, the repetition of steps 331 and 333 ensures the detection of risky conditions upon occurrence.

Figure 4A:
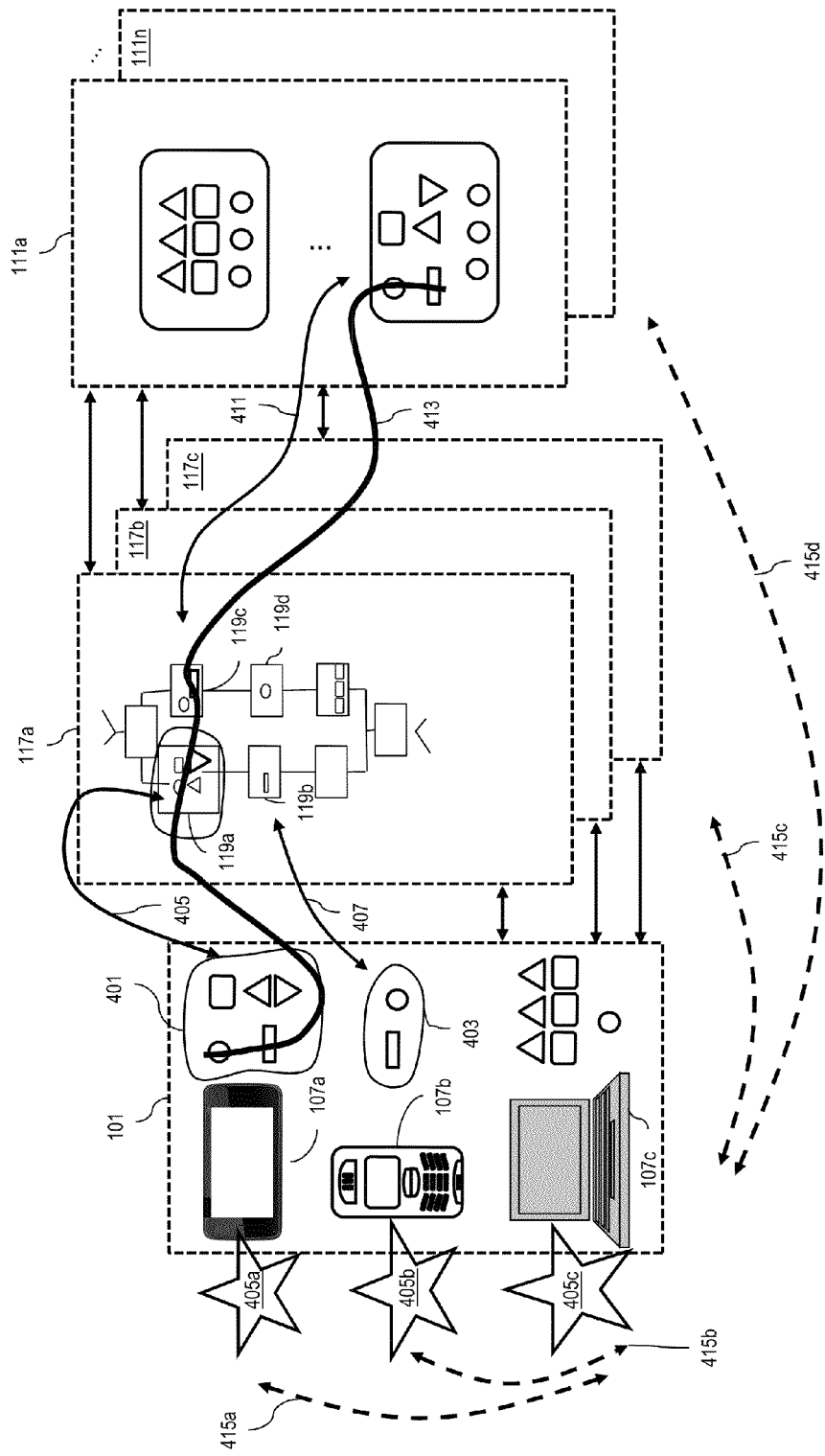
FIG. 4A is a diagram of multi-level computational architecture with backend support for device control in risk conditions, according to one embodiment.

FIG. 4A is a diagram of multi-level computational architecture with backend support for device control in risk conditions, according to one embodiment. In one embodiment, the set 101 comprises UEs 107a, 107b, and 107c, wherein UE 107a needs set 401 and UE 107b needs set 403 of computation closures to be executed for device control in risk conditions, wherein the closure sets 401 and 403 are determined by the device control support platform 103 as described in FIGS. 3A and 3B.

In one embodiment, the UEs 107a, 107b, and 107c are equipped with vibration devices 405a, 405b, and 405c respectively. There may be device level (level 101) as well as backend level (infrastructure 117a and cloud 111a) notification support that may affect vibration controls 405a-405c.

In one embodiment, device level support for UE 107a may include using computation closures framework at the UEs 107a, 107b, or 107c, using computational brokers 121a-121i of neighboring UEs 107b and 107c, while backend level support may include controlling vibration device 405a, may include using backend computational closures framework, using specific computational brokers for users with support service subscription, etc.

In one embodiment, device control support may be proactive, for example to avoid falling in risky environments, to notify the risk of losing the device, etc., or reactive, for example to notify users, other devices, or via other devices after certain decision criteria (parameters such as time, location, energy levels, battery life, etc.) is met.

In one embodiment, notification to a UE 107a from backend 117a or 111a (or from other devices 107b, or 107c) to initiate a broker (e.g. vibration) on the UE 107a, strengthens the mechanical and control framework definitions of vibration control.

In one embodiment, a threshold may be defined for the notification and how it may affect the UE 107a or other UEs 107b and 107c.

In one embodiment, if a missing UE 107a is visible to the infrastructure 117a, it may be easiest to use the infrastructure 117a for signaling to the UE 107a or to other devices. Alternatively, information related to cognitive connectivity, white spaces databases, the last registered location of the UE 107a in the infrastructure may be used for locating a lost UE 107a. The device control support platform 103 may contact other devices known to be in the area close to the UE 107a, based on this information, similar database information, or for example based on previously collected information on Wireless LAN access points.

In one embodiment, the UEs 107b and 107c connected to the device control support platform 103 and located in the neighborhood of UE 107a can search for the lost UE 107a based on the radios that they have available. After finding the missing UE 107a, this information can be sent to the device control support platform 103 for further processing.

In one embodiment, if there is information on the location of the person trying to find the missing UE 107a, other UEs 107b and 107c nearby may directly send alerts to another UE 107d (not shown) that is in possession of the same person.

In one embodiment, the device control by the device control support platform 103 may include forcing the missing device 107a (via other devices, infrastructure components, cloud components or a combination thereof) to play a particular tone or message, for example: "Find me and report to this number xxx-yyy-zzz and claim your reward for fining me".

In one embodiment the control may include forcing the UE 107a to communicate to its neighboring devices that it has been left unused for too long time, or when sensing any users or a particular user, communicate that it cannot find its user/owner.

It is noted that, if a UE 107a drops from a height of one meter with initially zero velocity, it will take 0.45 seconds for it to hit the ground. In one embodiment, by concentrating the weight of the UE 107a near the edge that can tolerate more pressure (e.g., a shock resistance edge) damage to more vulnerable parts of the UE 107a, such as the display, can be prevented.

In one embodiment, if the drop is from a high elevation that may threat the device safety, there may be enough time to switch off the UE 107a in order to prevent further damage. For example, the average switch to service interrupt routine when it is called due to a free-fall sensor signal is 2 to 5 microseconds. Additionally, other times can be used for preventive actions.

In one embodiment, due to lack of time after detecting a fall, there may not be enough time to establish a new connection to a cellular base station or a Wireless LAN access point.

In this embodiment, the UE 107a can be controlled via the connections established at the moment of falling for transmitting backup data. With cellular connectivity it would take some time to have a slot in the uplink, depending on the congestion. In Wireless LAN reserving a slot may not be necessary, however if the channels are reserved, backup transmission cannot be performed. In this embodiment, when a channel is silent, the Wireless LAN can immediately transmit the data.

In one embodiment, backup data transmission can be in the form of a data package to a secure server connected to the UE 107a via the communication network 105. The data to be transmitted can be selected beforehand based on a default setup or by the user, to contain, for example, the most recent changes after latest backup, any critical information selected beforehand, current calendar inputs, etc.

In one embodiment, the device control support platform 103 determines sets 401 and 403 of closures for controlling UEs 107a and 107b respectively. The device control support platform 103 uses the information provided by its components or from other levels infrastructures 117a-117c and clouds 111a-111n of the architecture, as described with respect to the flowchart of FIG. 3, in order to select a component of the infrastructure levels 117a, 117b, or 117c for the distribution of computation closures 401 and 403. In the example of FIG. 4A, the closures of set 401 are distributed to components 119a and 119c of the infrastructure 117a as shown by arrow 405 and the closures of set 403 are distributed to components 119b and 119d of the infrastructure 117a shown by arrow 407. Similarly, the infrastructure 117a may distribute the closures further to one or more cloud 111a-111n shown by arrow 411. The path 413 starting from set 401 in UE 107a, continuing through components 119a and 119c of the infrastructure 117a and leading to one or more cloud 111a-111n represents a functional flow for the associated closures. Once the execution is completed, the results of execution of the distributed closures can be aggregated and returned to UEs 107a and 107b.

It is noted that arrows 415a, 415b, 415c, and 415d show the paths for transfer of computational chains and computation closures determined by the device control support platform 103 for controlling UEs 107a and 107b in risk conditions.

Figure 4B:
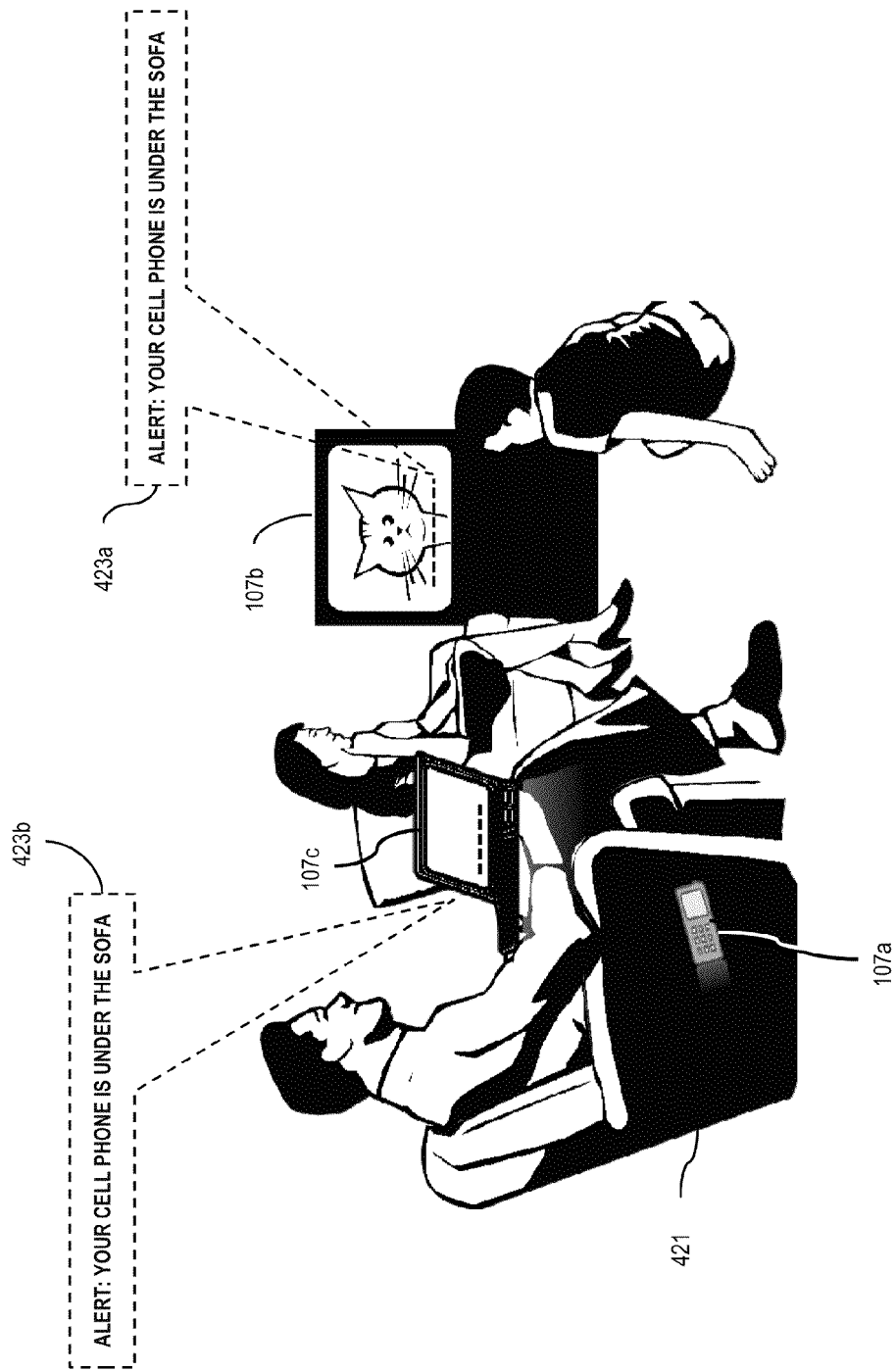
FIG. 4B is an exemplary diagram of providing backend support for device control in risk conditions, according to one embodiment.

FIG. 4B is an exemplary diagram of providing backend support for device control in risk conditions, according to one embodiment. In one embodiment, the UE 107a is fallen under sofa 421 and is in silent mode. In this embodiment, the computation determination module 201 may detect the fall of a UE 107a. The detection may be based on receiving sensor information from the UE 107a, monitoring information from other UEs 107b or 107c in the vicinity of the UE 107a. For example, a security camera may detect and report the fall to the device control support platform 103, a positioning module on UE 107a may report the location of UE 107a to the device control support platform 103, etc.

In one embodiment, the computation determination module 201 determines the actions that should be taken with regards to the collected information. For example, the action may be a displaying of an alert message via the other UEs 107b and 107c. As seen in FIG. 4B, alerts 423a, 423b, or both may be displayed on UEs 107b and 107c, respectively, in order to notify the user of the current location of UE 107a.

In one embodiment, the action to be taken may be predefined by the user of UE 107a. The user may have setup the UEs 107a, 107b, and 107c as a group so that alerts regarding each of the UEs can be displayed via the other UEs in the group. In other embodiment, the projection module 203 of the device control support platform 103 may have the authority (given by the user) to select alerting device 107b or 107c and transfer computational chains, closures, or a combination for alerting action based, for example, on account information associating devices 107b or 107c to the same user.

In one embodiment, the notification module 207 causes an execution of the computational chains and closures for alerting action which may lead to displaying of the alerts 423a and 423b on UEs 107b and 107c respectively.

Figure 5:
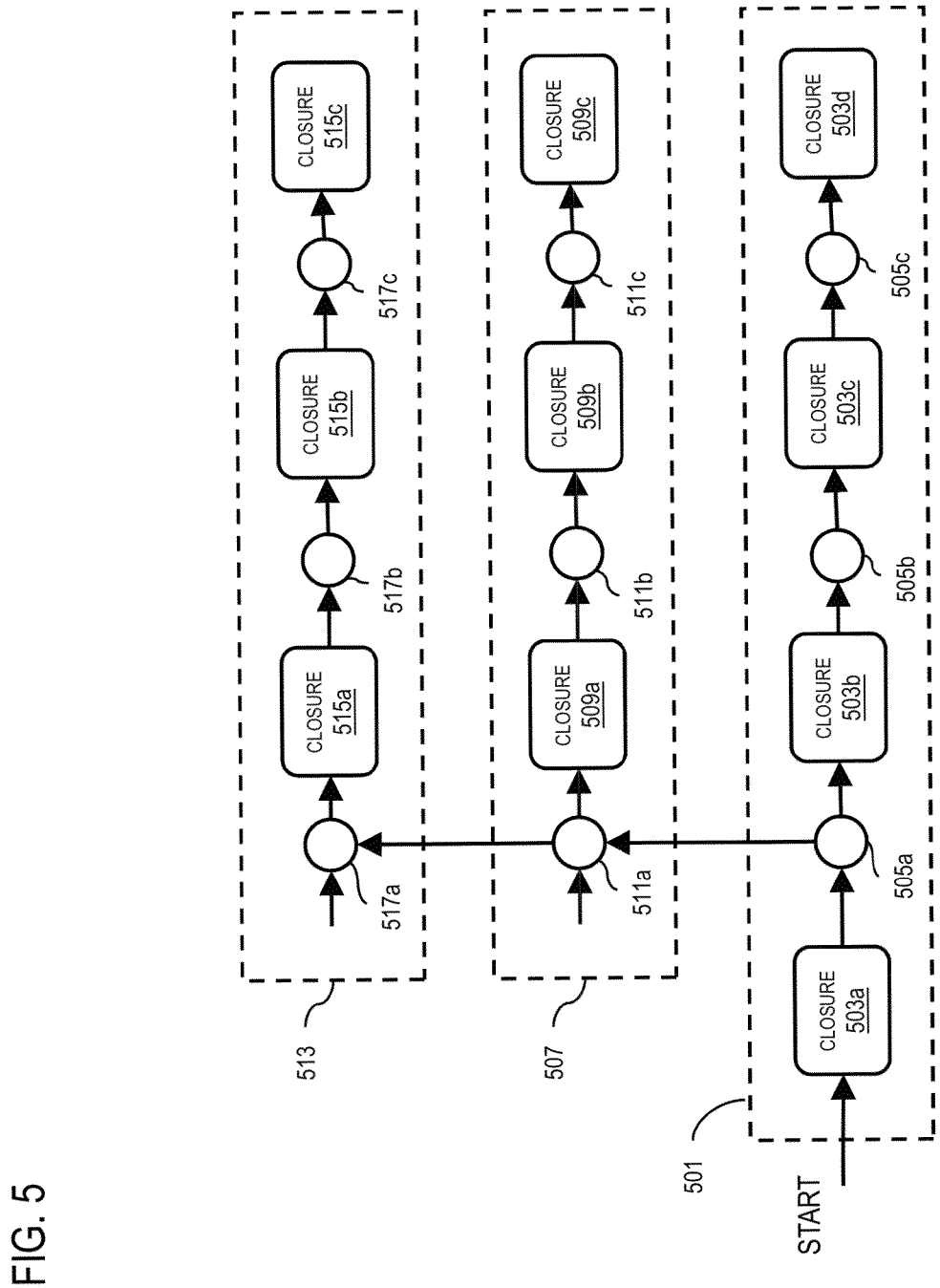
FIG. 5 is a diagram of distribution of computations in multi-level computational architecture, according to one embodiment.

FIG. 5 is a diagram of distribution of computations in multi-level computational architecture, according to one embodiment. FIG. 5 is a general representation of computation distribution. As seen in FIG. 5, the computation distribution starts at a component 501 of an architectural level (not shown). Each component may execute a set of closures that constitute a computation branch. For example, the branch 501 is composed of closures 503a-503d, wherein every two consecutive closures are connected via a connector and computational branches are communicating via connectors as well. For example, connectors 505a-505c connect closures 503a-503d. Connectors may also transfer information and data associated with a closure and its execution results to the next closure in the branch or to other branches. Additionally, connectors may function as links between related branches that constitute a distributed computation.

In one embodiment, connectors may contain information about parameters such as security requirement and/or capabilities, functional flows, distribution maps, links between closures and architectural levels, etc. Arrows connecting closures to connectors and connectors to next closures show the functional flow adopted based on the parameters. As seen in FIG. 5, the closures have been distributed from component 501 to component 507 via communication between connector 505a and connector 511a. The computation branch of component 507 includes closures 509a-509c communicating via connectors 511b and 511c, while branches 501 and 507 communicate via connectors 505a and 511a. Similarly, a third branch 513 has been formed of closures 515a-515c being executed at component 513 and connected by connectors 517b and 517c, while the branch communicates with other branches via connector 517a.

In one embodiment, the initial branch 501 may be in a UE 107a-107i, the second branch 507 in a component of the infrastructure 117a-117n, and the third branch in another component of the same infrastructure, a different infrastructure, in a cloud, or a combination thereof.

Figure 6A:
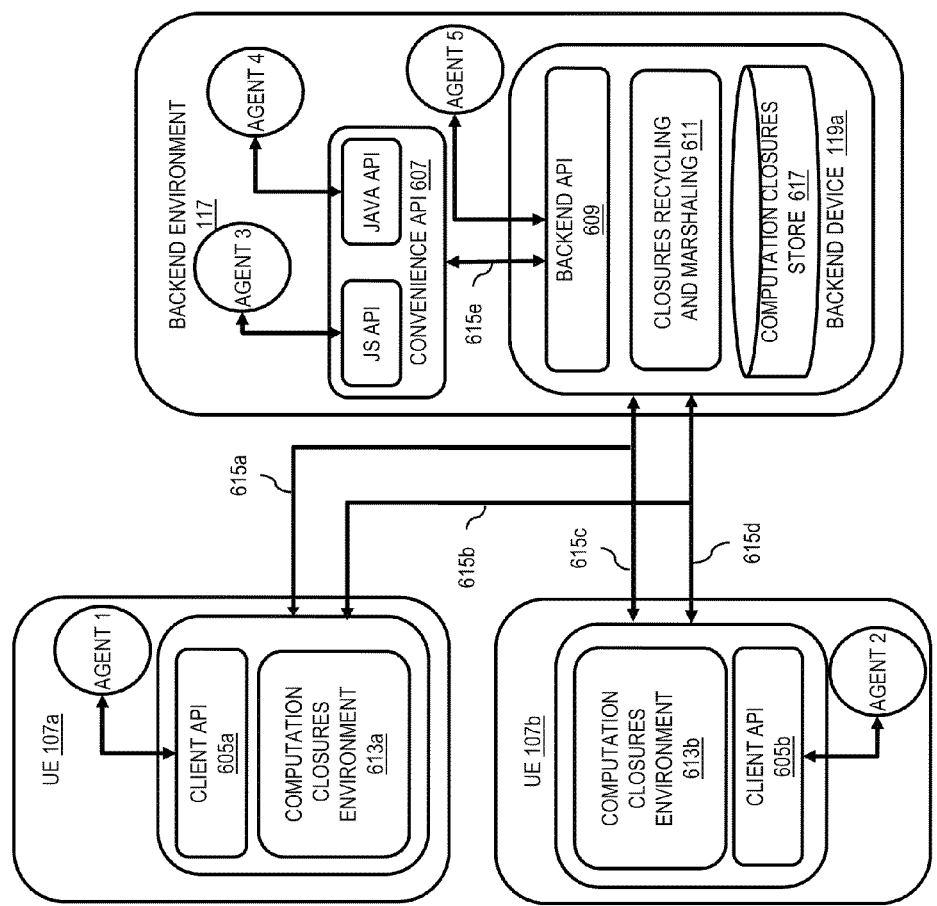

FIGS. 6A-6B are diagrams of computation distribution among devices, according to one embodiment. In one embodiment, in FIG. 6A, the backend environment 117 is a network infrastructure. The backend environment may also be a virtual run-time environment within a cloud 111 associated with the owner of UE 107a or on another UE 107b associated with the user. The backend environment 117 may include one or more components (backend devices) 119a and one or more Application Programming Interface (API) such as a convenience API 607 that may include APIs tailored to the software development environments used (e.g. JAVA, PHP, etc.). Furthermore, UEs 107a and 107b may include client APIs 605a and 605b. Each API enables interaction between devices and components within another device or an environment. For example, backend API 609 enables interaction between the backend device 119a and Agent5, and convenience API 607 enables interaction between the backend device 119a and agents Agent3 and Agent4, wherein each agent is a set of processes that handle computation closures within the backend environment 117. APIs 605a and 605b enable interaction between UE 107a and agent Agent1, and UE 107b and agent Agent2 respectively. As seen in the example of FIG. 6A, Agent3 works under PHP while Agent4 is a JAVA process. Each of the UEs 107a and 107b has a computation closure environment 613a and 613b which may be part of a cloud 111. Arrows 615a-615e represent distribution path of computation closures among the environments 613a, 613b and the computation closures store 617. The computation closures store 617 is a repository of computation closures that can be accessed and used by all the UEs and infrastructure components having connectivity to the backend environment 117.

In one embodiment, the backend device 119a may be equipped with a closure recycling and marshaling component 611 that monitors and manages any access to the computation closures store 617. In other embodiments the closure recycling and marshaling (i.e. standardization for uniform use) may be a function of the device control support platform 103.

In one embodiment, the computation closures within environments 613a, 613b and the computation closures store 617 may be composed based on anonymous function objects and automatically created by a compiling system using methods for generating anonymous function objects such as lambda expressions.

FIG. 6B is an expanded view of a computation closure environment 613 as introduced in FIG. 6A. The computation closure environment 613 may be composed of one or more computation closure generating components. In one embodiment the computation closure environment 613 has a services infrastructure 623 that provides various services for the user of the UE 107. The services may include any application that can be performed on the UE 107 such as, games, music, text messaging, voice calls, etc. In one embodiment, the services infrastructure 623 provides support for closure distribution under the supervision of a device control support platform 103 as discussed in FIG. 1, FIG. 2, and FIG. 3. The agent Agent1 retrieves the computation closures required by the services infrastructure 623 from the computation closures store 649 and stores the newly generated computation closures by the services infrastructure 623 into the computation closures store 649 for distribution purposes per arrow 641.

In another embodiment, the computation closure environment 613 has a developer experience module 627 that provides various tools for a developer for manipulating services offered by the UE 107. The tools may include standardized and/or abstract data types and services allowing the developers to chain processes together across development platforms. In one embodiment, the developer experience module 627 provides cross platform support for abstract data types and services under the supervision of a device control support platform 103 as discussed in FIG. 1. The agent Agent2 retrieves the computation closures required by the developer experience module 627 from the computation closures store 649 and stores the newly generated computation closures by the developer experience module 627 into the computation closures store 649 for distribution purposes per arrow 643.

In yet another embodiment, the computation closure environment 613 has a scalable computing module 631 that provides an abstract wrapper (i.e. monadic wrapper) for the transmitting closures 401. This abstraction provides computation compatibility between the closures 401 and the UE 107. The abstract wrapper may provide scheduling, memory management, system calls and other services for various processes associated with the closures 401. These services are provided under the supervision of the device control support platform 103 as discussed in FIG. 1. The agent Agent3 retrieves the computation closures required by the scalable computing module 631 from the computation closures store 649 and stores the newly generated computation closures by the scalable computing module 631 into the computation closures store 649 for distribution purposes per arrow 645. In one embodiment, the backend environment 117 may access the computation closures store 649 and exchange/transmit one or more computer closures 647 between the computation closures store 649 and the backend computation closures store 617.

Figure 7:
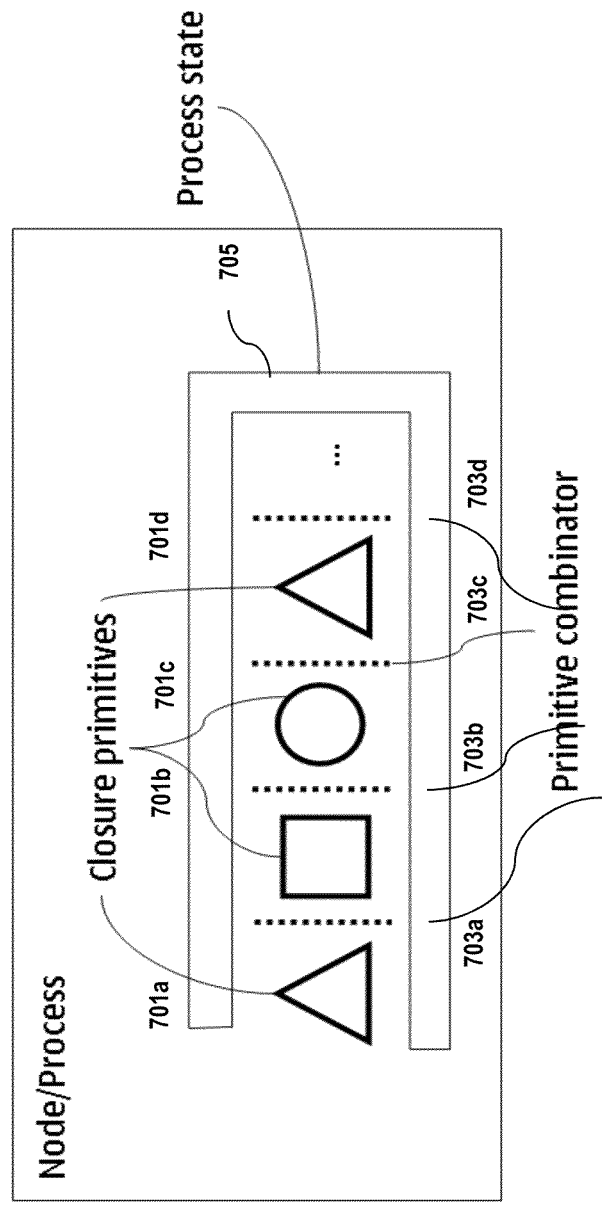
FIG. 7 is a diagram showing a process as a combination of primitive computation closures, according to one embodiment.

FIG. 7 is a diagram showing a process as a combination of primitive computation closures, according to one embodiment. Process 700 consists of closure primitives 701a-701d. The closure primitives 701a-701d, which are similar to geometric icon closures of FIG. 4A, are combined with each other into process 700 by combinators 703a-703d. The object 705 represents the execution requirements including process states under which the execution of closures 701a-701d combined by combinators 703a-703d will result in the process 700.

In one embodiment, distribution of process 700 includes distribution of closures 701a-701d, combinators 703a-703d and the process states 705 as independent elements into, for instance, an infrastructure environment 117. The independent closures 701a-701d from infrastructure environment 117 may be distributed into different components 119a-119m where they may be executed.

Figure 8:
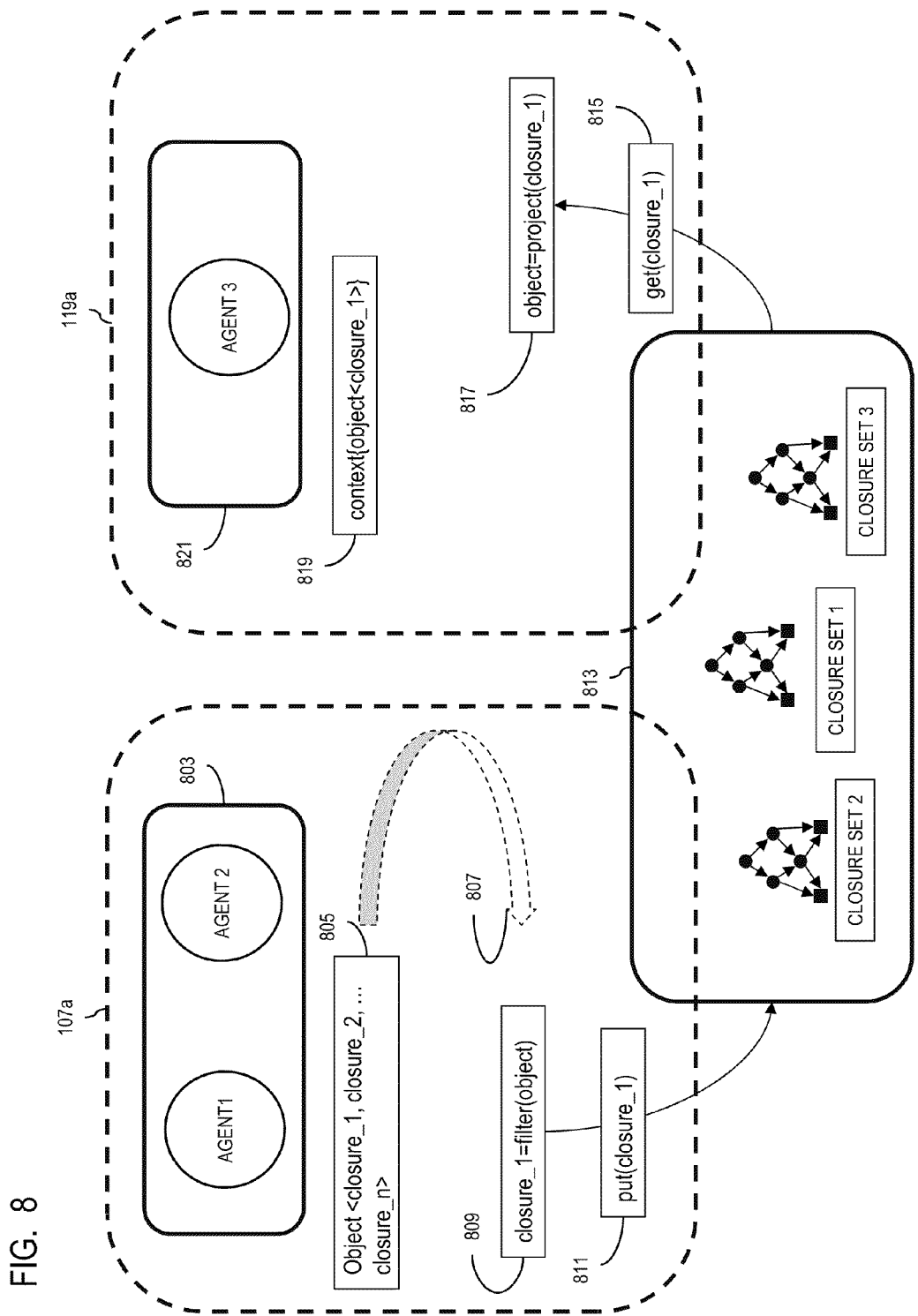
FIG. 8 is a diagram of process distribution from a device to another device, according to one embodiment.

FIG. 8 is a diagram of process distribution from a device to another device, according to one embodiment. In one embodiment, the device 107a is a UE associated with the user. The UE 107a may include a user context 803 which is being transmitted among devices. Agent1 and Agent2 are processors that calculate and handle computation closures within the user context 803. The number of agents may be different in different devices based on their design, functionality, processing power, etc. Block 805 represents an Object as a set of computation closures, closure 1, closure 2, ..., and closure n, where each closure is a component of a larger process, for example, related to a service provided to the user by the user equipment 107a. Each closure is a standalone process that can be executed independently from the other closures. In the example of FIG. 8, the filtering process 807 extracts closure_1 from the closure set Object via filtering the set (shown in block 809). The extracted closure_1 is added to a computation closure store 813 using the exemplary Put command 811.

It is assumed, in this example, that component 119a of an infrastructure level (not shown) is selected by the device control support platform 103 as a destination for closure distribution from UE 107a, based on the availability, proximity, battery life, computation cost, performance, security level, etc. The extracted computation closure, closure_1 is transmitted to component 119a following the assignment of a distribution path (similar to path 413 in FIG. 4A), and is executed on component 119a.

In one embodiment, the component 119a receives the computation closure closure_1 and extracts it from the computation closure store 813 using the Get command 815. The extracted closure_1 is projected into a closure with the user device context and the object 817 is produced. The block 819 represents the reconstruction of the closure into the initial context by a component in charge of the execution. The aggregated context may then be executed in the run-time environment 821 of component 119a by Agent3.

In another embodiment, the UE 107a and component 119a may exchange places and the distribution is performed from the component 119a to UE 107a or both devices may be UEs. In this embodiment the decomposition and aggregation processes are similar to the above example.

Figure 9:
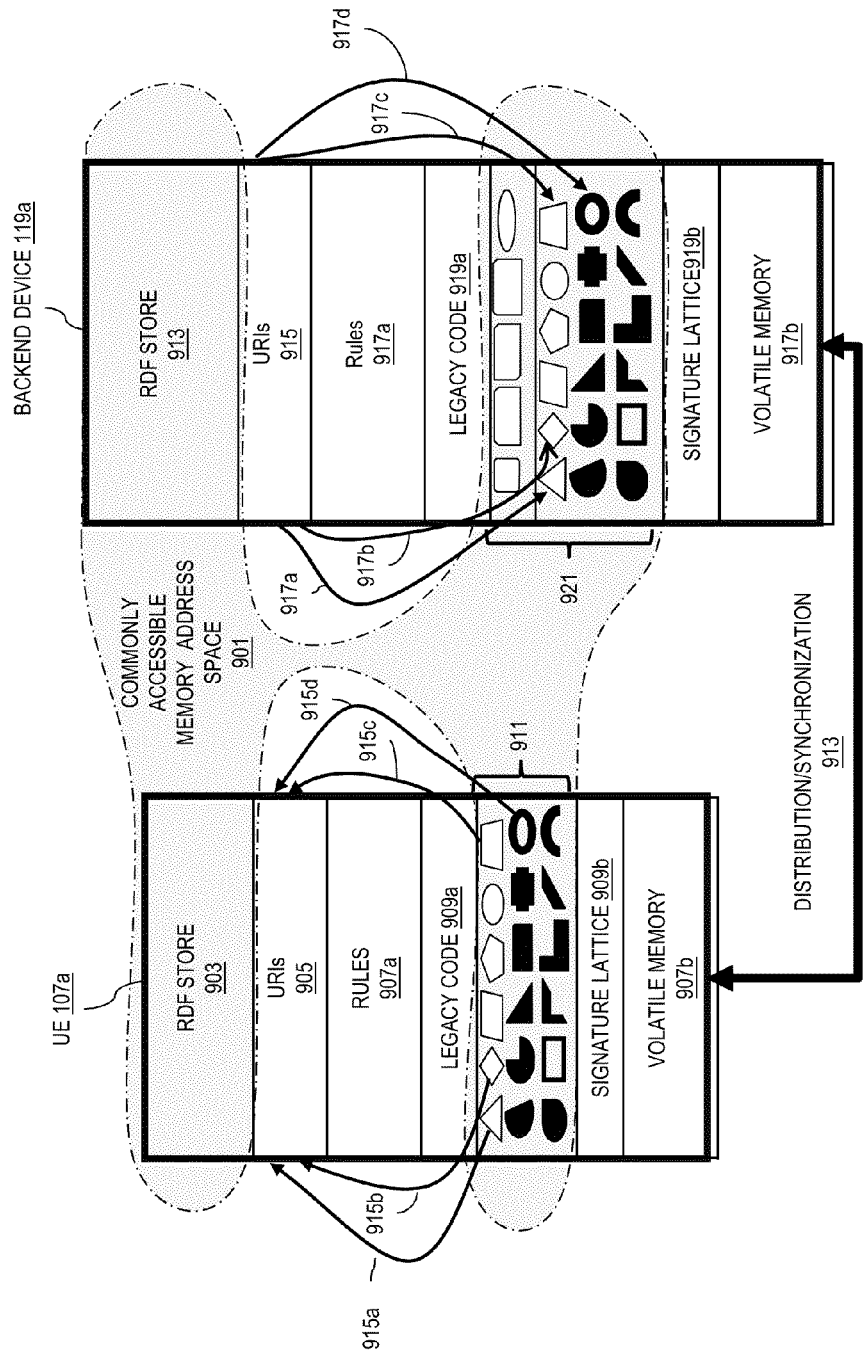
FIG. 9 is a diagram of computation closure allocation/mapping, according to one embodiment.

FIG. 9 is a diagram of computation closure allocation/mapping, according to one embodiment. The diagram of FIG. 9 shows a commonly accessible memory address space 901 formed between a UE 107*a* as a client and the backend device 119*a* as a component of a computation infrastructure 117.

In one embodiment, the UE 107*a* may include RDF store 903, which holds computation closures for processes associated with the UE 107*a*. Similarly the backend device 119*a* may include a RDF store 913, which holds computation closures associated with processes related to device 119*a*, UEs 107*a*-107*i*, or any other devices having connectivity to device 119*a* or cloud 111.

In other embodiments, the Uniform Resource Identifiers (URIs) 905 in UE 107*a* and 915 in backend device 119*a* may be used to identify names or resources accessible to their respective devices via the communication network 105. Additionally, UE 107*a* and backend device 119*a* may have rule sets 907*a* and 917*a* that include security rules imposed on device similar to rules 569*a*-569*b* of FIG. 5B. It is noted that the rule base 907*a* of UE 107*a* may be a subset of the rule base 917*a* of the backend device 119*a*, wherein the rules 917*a* is a subset of a superset of rules managed by a cloud 111. Furthermore, the legacy codes associated with each device may be stored in legacy code memory areas 909*a* and 909*b* on UE 107*a* and 919*a* and 919*b* on backend device 119*a*.

In one embodiment, UE 107*a* may be provided with a non-volatile memory space 911 as a closure store. The closure store 911 may include a set of closure primitives shown as geometric objects, similar to primitives of sets 401 or 403 of FIG. 4A. Similarly, the backend device 119*a* may be provided with a non-volatile memory space 921 as a closure store. The closure store 921 may also include a set of closure primitives shown as geometric objects. In one embodiment, the closure store 911 is a subset of closure store 921 determined, at least in part, based on one or more criteria such as time of access, frequency of access, a priority classification, security settings, etc. The geometric shapes of closure stores 911 and 921 have been each divided into two groups of solidly filled geometric shapes (representing signed closures) and unfilled geometric shapes (representing unsigned closures). Since non-volatile memories are costly and require extensive resources (e.g. power consumption) compared with volatile memories (such as 907*a*, 907*b*, 917*a*, and 917*b*), the capacity of non-volatile memory on a UE 107*a*-107*i* is limited. However, a backend device 119*a*, serving high numbers of users, may be equipped with larger volumes of non-volatile memory spaces. Because of the limited capacity of non-volatile memory spaces on UEs 107*a*-107*i*, and also because differing levels of security setup on various devices, only a subset of the closure store 921 is stored locally at the closure store 911 for local use by the UE 107*a*. In order to minimize the number of times a UE 107 needs to retrieve one or more primitives from closure store 921 of device 109*a*, the subset 911 is determined based on one or more criteria. In one embodiment, the closure store 911 may be determined as a set of the most frequently accessed closure primitives of closure store 921 by UE 107*a*. In another embodiment, the closure store 911 may be determined as a set of the most recently accessed closure primitives of closure store 921 by UE 107*a*. In other embodiments, various combined conditions and criteria may be used for determining subset 911 from set 921 as the content of closure store for UE 107*a*. Furthermore, the closure stores 911 and 921 may be periodically synchronized. The synchronization of closure stores ensures that any changes (addition, deletion, modification, etc.) in closure primitives and in root elements of the signature lattice of closure store 921 are reflected in the closure store 911.

In one embodiment, for execution of a closure set 401 (a subset of closure store 911) associated with a process on UE 107*a*, the set 401 can be transmitted under the supervision of the device control support platform 103 and after verification of the security of closures and capabilities of the destination component, to the backend device 119*a* which is a component of the infrastructure 117 (the distribution path shown as arrow 923). The device control support platform 103 may then inform the processing components of the UE 107*a*, the backend device 119*a* or a combination thereof (the processing components are not shown), that the security of closure primitives has been approved and the closures are ready for execution. Alternatively, the device control support platform 103 may determine that the closures are not approved and terminate their distribution and execution.

In one embodiment, any changes on the closure store 921 of the backend device 119*a* (e.g., addition, deletion, modification, etc.) may first enter the URIs 915 via the communication network 105. The changes may then be applied from URIs 915 on closure store 921 shown by arrows 927*a*-927*d*. Similarly, the closure store 911 is updated based on the content of the closure store 921 and the updates are shared with other authorized components within UE 107*a* (e.g. with URIs 905 as shown by arrows 925*a*-925*d*).

In one embodiment, the commonly accessible memory address space 901 is formed from the RDF stores 903 and 913 and the closure stores 911 and 921. The commonly accessible memory address space 901 can be accessed as a continuous memory space by each of the devices 107*a* and 119*a*.

The processes described herein for providing end-to-end security in multi-level distributed computations may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

The processes described herein for providing secure signing and utilization of distributed computations may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

The processes described herein for providing backend support for device control in risk conditions may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
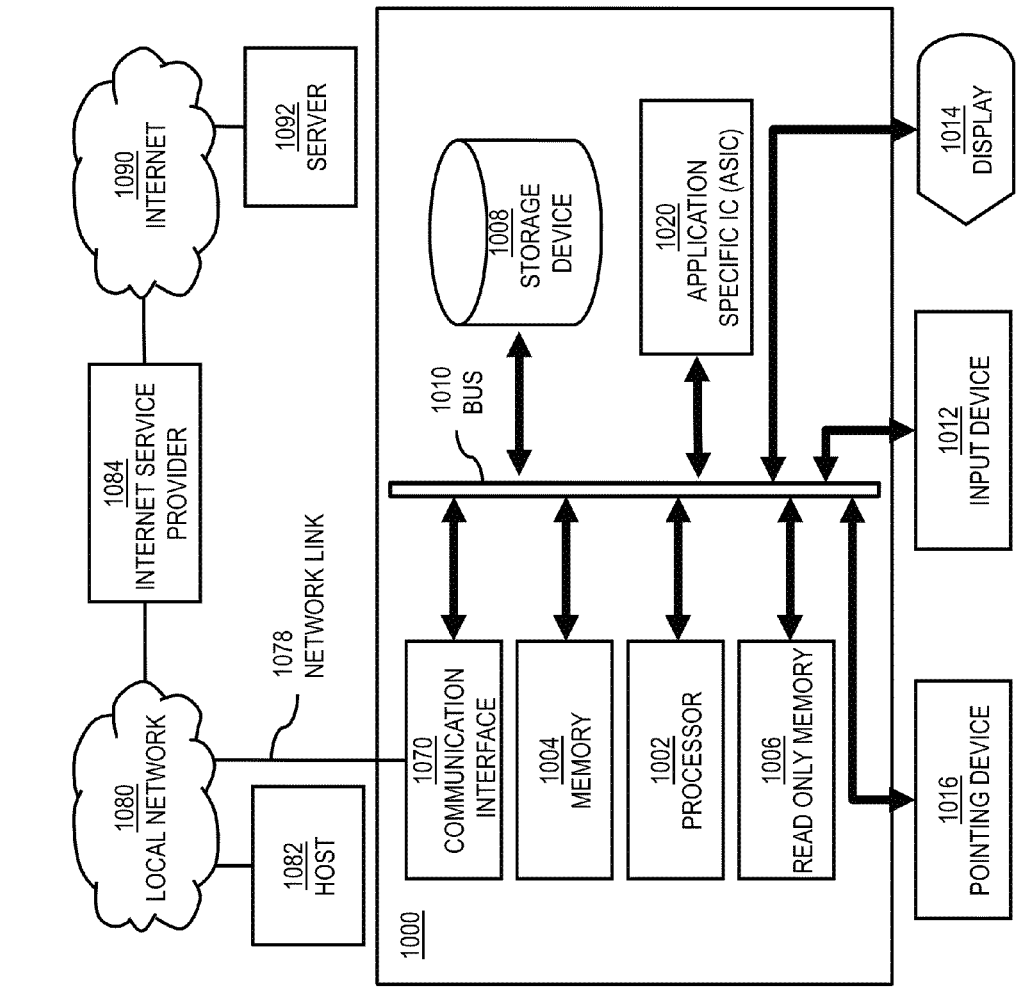
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to provide backend support for device control in risk conditions as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of providing backend support for device control in risk conditions.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to providing backend support for device control in risk conditions. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for providing backend support for device control in risk conditions. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing backend support for device control in risk conditions, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for providing backend support for device control in risk conditions to the UEs 107a-107i.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to provide backend support for device control in risk conditions as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of providing backend support for device control in risk conditions.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide backend support for device control in risk conditions. The memory 1105 also stores the data associated with or generated by the execution of the inventive steps.

Figure 12:
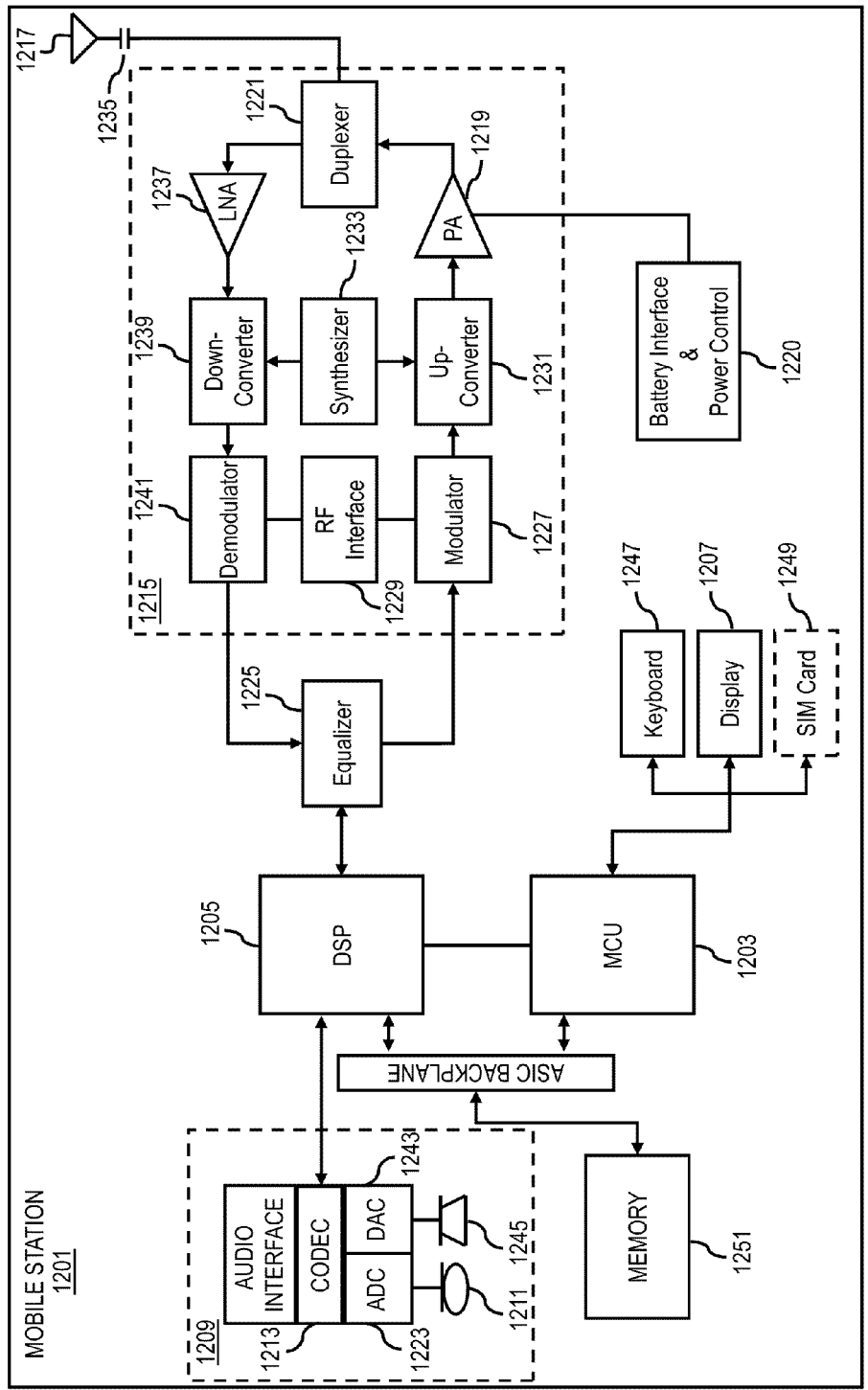
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of providing backend support for device control in risk conditions. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of providing backend support for device control in risk conditions. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide backend support for device control in risk conditions. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    one or more computational chains consisting, at least in part, of one or more computation closures for managing one or more risk conditions associated with at least one device;
    a determination of one or more other devices based, at least in part, on proximity information, resource availability information, connectivity information, or a combination thereof, wherein the one or more other devices include, at least in part, one or more peer devices;
    a projection, a distribution, or a combination thereof of the one or more computational chains, the one or more computation closures, or a combination thereof to, at least in part, one or more client devices, the one or more peer devices; and
    an execution of at least a portion of the one or more computational chains, the one or more computation closures, or a combination thereof to cause, at least in part, an initiation of at least one computational broker at the at least one device for managing the one or more risk conditions,
    wherein the one or more risk conditions correspond to one or more risks associated with the at least one device, and
    wherein the one or more risk conditions are managed so that the one or more risks are anticipated before the one or more risks are actualized.

2. A method of claim 1, wherein the at least one computational broker causes, at least in part, an initiation of one or more actions at the least one device, the one or more other devices, or a combination thereof based, at least in part, on the one or more risk conditions.

3. A method of claim 2, wherein the one or more actions include, at least in part, one or more activations of at least one vibration control mechanism to cause, at least in part, a change in a location, a position, a posture, or a combination thereof of at the least one device.

4. A method of claim 1, wherein the (1) data and/or (2) information and/or (3) at least one signal are further based, at least in part, on the following:
    an execution of the one or more computational chains, the one or more computation closures, or a combination to generate one or more notifications regarding the one or more risk conditions.

5. A method of claim 4, wherein the initiation of the at least one computational broker is based, at least in part, on the one or more notifications.

6. A method of claim 1, wherein the (1) data and/or (2) information and/or (3) at least one signal are further based, at least in part, on the following:
    a processing of sensor information, contextual information, or a combination thereof associated with the at least one device, the one or more other devices, or a combination thereof.

7. A method of claim 1, wherein the one or more risk conditions relate, at least in part, on one or more temporal parameters, one or more location parameters, one or more positional parameters, one or more postural parameters, or a combination thereof associated with the at least one device.

8. A method of claim 1, wherein the (1) data and/or (2) information and/or (3) at least one signal are further based, at least in part, on the following:
   at least one determination of the at least one computational broker based, at least in part, on subscription status information associated with the at least one device.

9. An apparatus comprising:
   at least one processor; and
   at least one memory including computer program code for one or more programs,
   the at least one memory and the computer program code configured to, with the at least one processor, cause the apparatus to perform at least the following,
      determine one or more computational chains consisting, at least in part, of one or more computation closures for managing one or more risk conditions associated with at least one device;
      cause a determination of one or more other devices based, at least in part, on proximity information, resource availability information, connectivity information, or a combination thereof, wherein the one or more other devices include, at least in part, one or more peer devices;
      cause, at least in part, a projection, a distribution, or a combination thereof of the one or more computational chains, the one or more computation closures, or a combination thereof to, at least in part, the one or more peer devices; and
      cause, at least in part, an execution of at least a portion of the one or more computational chains, the one or more computation closures, or a combination thereof to cause, at least in part, an initiation of at least one computational broker at the at least one device for managing the one or more risk conditions,
      wherein the one or more risk conditions correspond to one or more risks associated with the at least one device, and
      wherein the one or more risk conditions are managed so that the one or more risks are anticipated before the one or more risks are actualized.

10. An apparatus of claim 9, wherein the at least one computational broker causes, at least in part, an initiation of one or more actions at the least one device, the one or more other devices, or a combination thereof based, at least in part, on the one or more risk conditions.

11. An apparatus of claim 10, wherein the one or more actions include, at least in part, one or more activations of at least one vibration control mechanism to cause, at least in part, a change in a location, a position, a posture, or a combination thereof of at the least one device.

12. An apparatus of claim 9, wherein the apparatus is further caused to:
   cause, at least in part, an execution of the one or more computational chains, the one or more computation closures, or a combination to generate one or more notifications regarding the one or more risk conditions.

13. An apparatus of claim 12, wherein the initiation of the at least one computational broker is based, at least in part, on the one or more notifications.

14. An apparatus of claim 9, wherein the apparatus is further caused to:
   process and/or facilitate a processing of sensor information, contextual information, or a combination thereof associated with the at least one device, the one or more other devices, or a combination thereof.

15. An apparatus of claim 9, wherein the one or more risk conditions relate, at least in part, on one or more temporal parameters, one or more location parameters, one or more positional parameters, one or more postural parameters, or a combination thereof associated with the at least one device.

16. An apparatus of claim 9, wherein the apparatus is further caused to:
   determine the at least one computational broker based, at least in part, on subscription status information associated with the at least one device.

* * * * *